(12) United States Patent
Kim et al.

(10) Patent No.: US 9,215,675 B2
(45) Date of Patent: Dec. 15, 2015

(54) DETERMINING TRANSMIT POWER OF A SOUNDING REFERENCE SIGNAL FOR A FIRST CELL BASED ON POWER FOR A SECOND CELL AND POWER OFFSET

(75) Inventors: Hakseong Kim, Anyang-si (KR); Hanbyul Seo, Anyang-si (KR); Suckchel Yang, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 14/237,162

(22) PCT Filed: Aug. 16, 2012

(86) PCT No.: PCT/KR2012/006514
§ 371 (c)(1),
(2), (4) Date: Feb. 4, 2014

(87) PCT Pub. No.: WO2013/025058
PCT Pub. Date: Feb. 21, 2013

(65) Prior Publication Data
US 2014/0213315 A1    Jul. 31, 2014

Related U.S. Application Data

(60) Provisional application No. 61/524,751, filed on Aug. 17, 2011, provisional application No. 61/525,205, filed on Aug. 19, 2011.

(51) Int. Cl.
*H04W 52/38* (2009.01)
*H04W 52/32* (2009.01)

(52) U.S. Cl.
CPC ............ *H04W 52/38* (2013.01); *H04W 52/325* (2013.01)

(58) Field of Classification Search
None
See application file for complete search history.

(56) References Cited

U.S. PATENT DOCUMENTS 8,447,343 B2 * 5/2013 Gerstenberger et al. ...... 455/522
2008/0045260 A1 * 2/2008 Muharemovic et al. ...... 455/522
(Continued)

FOREIGN PATENT DOCUMENTS

KR    1020090107029    10/2009
KR    1020100123657    11/2010
(Continued)

OTHER PUBLICATIONS

PCT International Application No. PCT/KR2012/006514, Written Opinion of the International Searching Authority dated Jan. 28, 2013, 16 pages.
(Continued)

*Primary Examiner* — Philip Sobutka
(74) *Attorney, Agent, or Firm* — Lee, Hong, Degerman, Kang & Waimey (57) ABSTRACT

The present invention relates to a method for a terminal transmitting a sounding reference signal in a wireless communication system. More particularly, the method comprises the steps of: receiving from a network at least one first transmission power offset value of the sounding reference signal for a first cell; deciding transmission power of the sounding reference signal for the first cell, based on transmission power for an uplink data channel for a second cell and the at least one transmission power offset value; and transmitting the sounding reference signal for the first cell to the first cell.

8 Claims, 6 Drawing Sheets

(56) References Cited

U.S. PATENT DOCUMENTS

2008/0280638 A1* 11/2008 Malladi et al. ............... 455/522
2011/0098054 A1* 4/2011 Gorokhov et al. ......... 455/452.1

FOREIGN PATENT DOCUMENTS

WO 2010050776 5/2010
WO 2011041555 4/2011

OTHER PUBLICATIONS

PCT International Application No. PCT/KR2012/006514, Written Opinion of the International Searching Authority dated Jan. 28, 2013, 12 pages.

* cited by examiner

DETERMINING TRANSMIT POWER OF A SOUNDING REFERENCE SIGNAL FOR A FIRST CELL BASED ON POWER FOR A SECOND CELL AND POWER OFFSET

CROSS-REFERENCE TO RELATED APPLICATIONS

This application is the National Stage filing under 35 U.S.C. 371 of International Application No. PCT/KR2012/006514, filed on Aug. 16, 2012, which claims the benefit of U.S. Provisional Application Serial Nos. 61/524,751, filed on Aug. 17, 2011, and 61/525,205, filed on Aug. 19, 2011, the contents of which are all hereby incorporated by reference herein in their entirety.

TECHNICAL FIELD

The present invention relates to a wireless communication system. More specifically, the present invention relates to a method for transmitting a sounding reference signal in an eNB cooperative wireless communication system and an apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide a method for transmitting and receiving a signal to and from a base station by a user equipment in a wireless communication system, and an apparatus therefor.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting a sounding reference signal by a user equipment in a wireless communication system, including receiving at least one first transmit power offset value of a sounding reference signal for a first cell from a network; determining a transmit power of the sounding reference signal for the first cell, based on a transmit power of an uplink data channel for a second cell and on the at least one first transmit power offset value; and transmitting the sounding reference signal for the first cell to the first cell.

The method may further include receiving a second transmit power offset value of a sounding reference signal for the second cell from the network; determining a transmit power of the sounding reference signal for the second cell, based on a transmit power of the uplink data channel for the second cell and on the second transmit power offset value; and transmitting the sounding reference signal for the second cell to the second cell. The sounding reference signal for the first cell may be an aperiodic sounding reference signal and the sounding reference signal for the second cell may be a periodic sounding reference signal.

The at least one first transmit power offset may be received through a radio resource control (RRC) layer signal. In this case, the method may further include receiving an aperiodic sounding reference signal triggering message from the second cell, wherein the aperiodic sounding reference signal triggering message includes an indicator of an offset value to be applied to the transmit power of the sounding reference signal for the first cell among the at least one first transmit power offset value.

In another aspect of the present invention, provided herein is a user equipment in a wireless communication system, including a reception module configured to receive at least one first transmit power offset value of a sounding reference signal for a first cell from a network; a processor configured to determine a transmit power of the sounding reference signal for the first cell, based on a transmit power of an uplink data channel for a second cell and on the at least one first transmit power offset value; and a transmission module configured to transmit the sounding reference signal for the first cell to the first cell.

The reception module may further receive a second transmit power offset value of a sounding reference signal for the second cell from the network, the processor may determine a transmit power of the sounding reference signal for the second cell, based on a transmit power of the uplink data channel for the second cell and on the second transmit power offset value, and the transmission module may transmit the sounding reference signal for the second cell to the second cell.

The reception module may receive the at least one first transmit power offset through a radio resource control (RRC) layer signal. The reception module may receive an aperiodic sounding reference signal triggering message from the second cell, and the aperiodic sounding reference signal triggering message may include an indicator of an offset value to be applied to the transmit power of the sounding reference signal for the first cell among the at least one first transmit power offset value.

Advantageous Effects

According to the present invention, a user equipment can efficiently transmit and receive a sounding reference signal in an eNB cooperative wireless communication system.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

The following technology may be applied to a variety of wireless access systems using CDMA, FDMA, TDMA, OFDMA, and SC-FDMA. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in downlink and SC-FDMA in uplink. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

In a wireless communication system, a user equipment (UE) receives information from an evolved Node B (eNB or eNode B) on downlink (DL) and transmits information to the eNB on uplink (UL). Data and various types of control information are transmitted and received between the eNB and the UE and there are various physical channels according to the types/usages of the transmitted and received data and control information.

Figure 1:
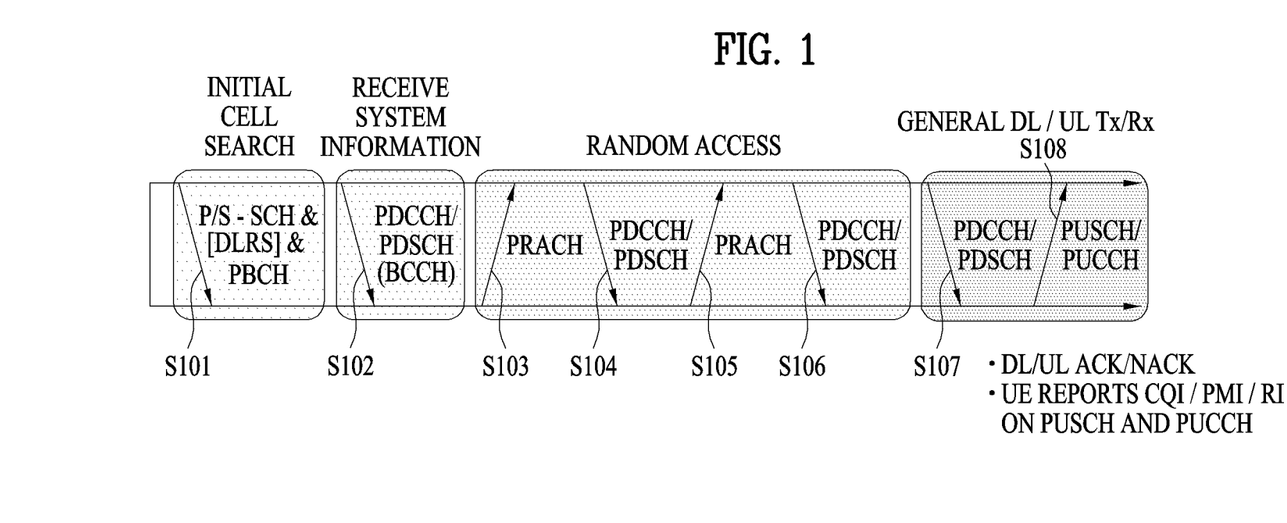
FIG. 1 illustrates physical channels used in a 3GPP LTE system as an exemplary wireless communication system and a general signal transmission method using the same.

FIG. 1 is a diagram illustrating physical channels used in a 3GPP LTE system and a general signal transmission method using the same.

When a UE is powered on or enters a new cell, the UE performs initial cell search such as synchronization acquisition with an eNB in step S101. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a downlink channel state.

Upon completion of initial cell search, the UE may receive a physical downlink control channel (PDCCH) and a physical downlink shared channel (PDSCH) according to information included in the PDCCH to acquire more detailed system information in step S102.

Next, the UE may perform a random access procedure such as steps S103 to S106 to complete access to the eNB. To this end, the UE may transmit a preamble through a physical random access channel (PRACH) (S103) and receive a response message to the preamble through the PDCCH and the PDSCH corresponding to the PDCCH (S104). In the case of contention-based random access, a contention resolution procedure including transmission of a PRACH signal (S105) and reception of a PDCCH signal and a PDSCH signal corresponding to the PDCCH signal (S106) may be additionally performed.

The UE which has performed the above procedures may receive a PDCCH and/or PDSCH signal (step S107) and transmit a physical uplink shared channel (PUSCH) and/or physical uplink control channel (PUCCH) signal (step S108) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indication (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 2A:
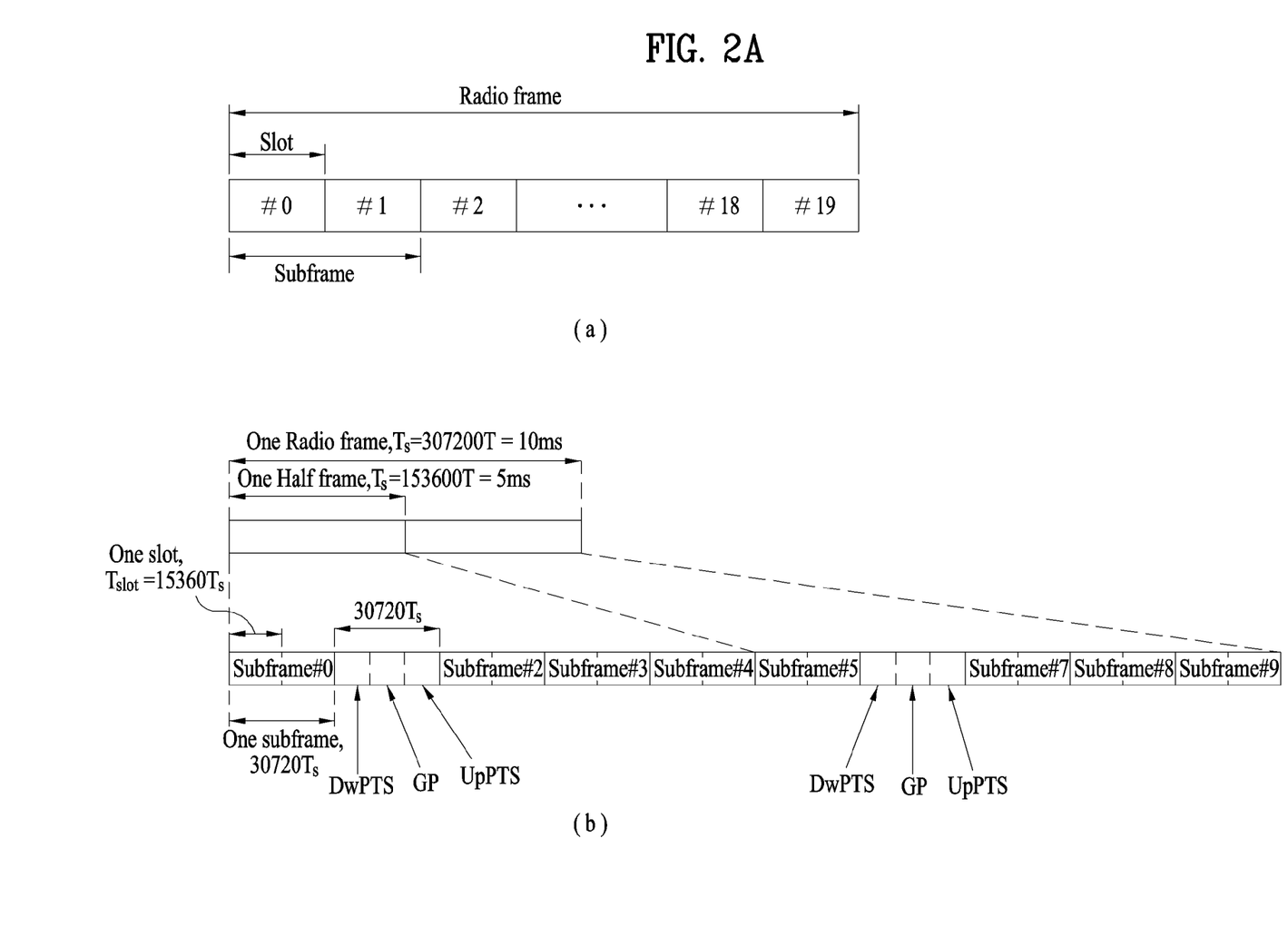
FIG. 2a illustrates the structure of a radio frame.

FIG. 2a illustrates the structure of a radio frame. In a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

(a) of FIG. 2a is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE moves fast, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

(b) of FIG. 2a illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $T_s=1/(15000\times2048)$. The remaining region except for a DwPTS and an UpPTS is set as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, the type 2 radio frame structure, that is, UL/DL subframe configurations in a TDD system are listed in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

The above-described structures of radio frames are purely exemplary. Accordingly, the number of subframes in a radio frame, the number of slots in a subframe, and the number of symbols in a slot may be changed in various manners.

Figure 2B:
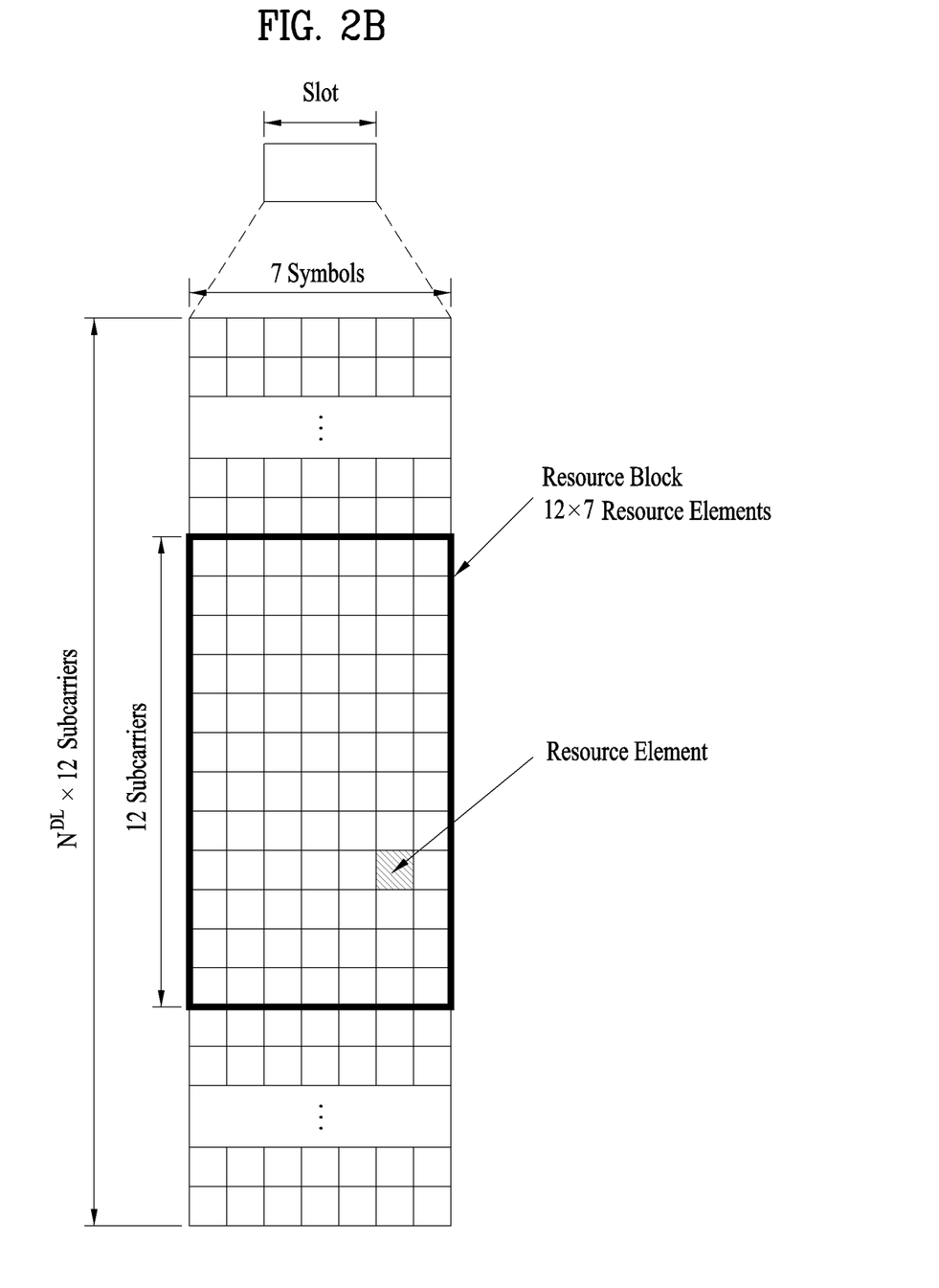
FIG. 2b illustrates a resource grid of a DL slot.

FIG. 2b illustrates a resource grid of a DL slot.

Referring to FIG. 2b, a DL slot includes a plurality of OFDM symbols in the time domain. One DL slot includes 7(6) OFDM symbols in the time domain and an RB includes 12 subcarriers in the frequency domain. Each element of the resource grid is referred to as a resource element (RE). An RB includes 12×7 (6) REs. The number of RBs in a DL slot, $N_{RB}$, depends on a DL transmission bandwidth. A UL slot may have the same structure as a DL slot. Instead, an OFDM symbol is replaced with an SC-FDMA symbol.

Figure 3:
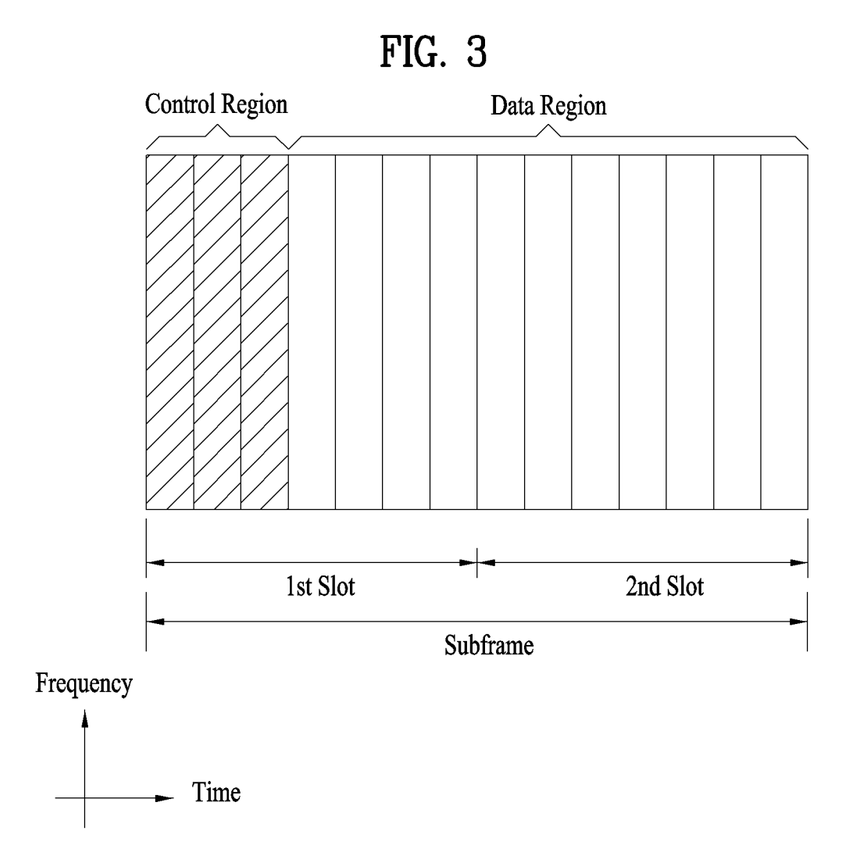
FIG. 3 illustrates the structure of a DL subframe.

FIG. 3 illustrates the structure of a DL subframe.

Referring to FIG. 3, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted in an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or usage of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

Figure 4:
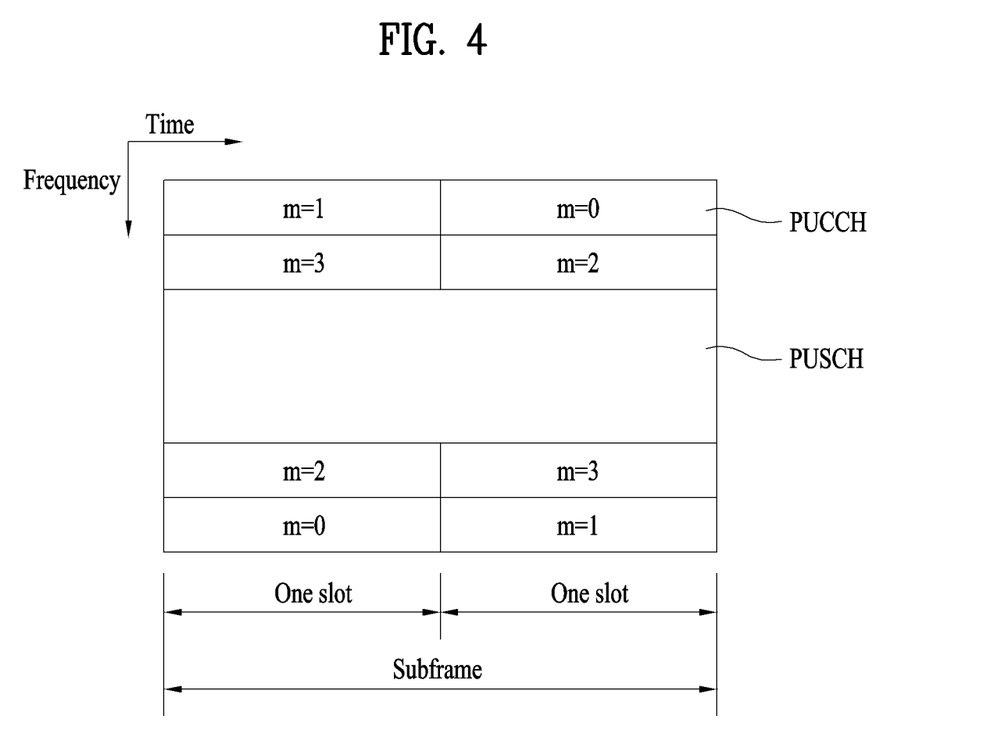
FIG. 4 illustrates the structure of a UL subframe.

FIG. 4 illustrates the structure of a UL subframe in the LTE system.

Referring to FIG. 4, a UL subframe includes a plurality of (e.g. 2) slots. A slot may include a different number of SC-FDMA symbols according to CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region in the frequency domain and the RB pair frequency-hops over a slot boundary.

The PUCCH may deliver the following control information.
 SR: SR is information requesting UL-SCH resources and is transmitted using on-off keying (OOK).
 HARQ ACK/NACK: HARQ ACK/NACK is a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.
 CSI: CSI is feedback information regarding a DL channel. CSI includes a CQI and multiple input multiple output (MIMO)-related feedback information includes an RI, a PMI, a precoding type indicator (PTI), etc. The CSI occupies 20 bits per subframe.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries an SRS, the last SC-FDMA symbol of the subframe is also excluded in transmitting the control information. The RSs are used for coherent detection of the PUCCH.

Meanwhile, it is expected that the next-generation mobile communication standard, LTE-A, will support coordinated multi-point (CoMP) transmission, which was not supported in the legacy LTE standard, in order to increase data rate. CoMP refers to a transmission scheme in which two or more eNBs or cells communicate with a UE through cooperation in order to increase communication performance between a UE located in a shadow area and an eNB (a cell or sector).

CoMP transmission schemes may be classified into CoMP-joint processing (CoMP-JP) of cooperative MIMO characterized by data sharing and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in CoMP transmission may transmit data to the UE at a specific time point (dynamic point selection (DPS)). In contrast, in CoMP-CS/CB, a UE may receive data instantaneously from one eNB, that is, a serving eNB by beamforming.

In UL CoMP-JP, eNBs may receive a PUSCH signal simultaneously from a UE (joint reception (JR)). In contrast, in UL CoMP-CS/CB, only one eNB receives a PUSCH from a UE. Herein, cooperative cells (or eNBs) may make a decision as to whether to use CoMP-CS/CB.

Meanwhile, the CoMP scheme may be applied to a heterogeneous network as well as to a homogeneous network configured with macro eNBs only.

Figure 5:
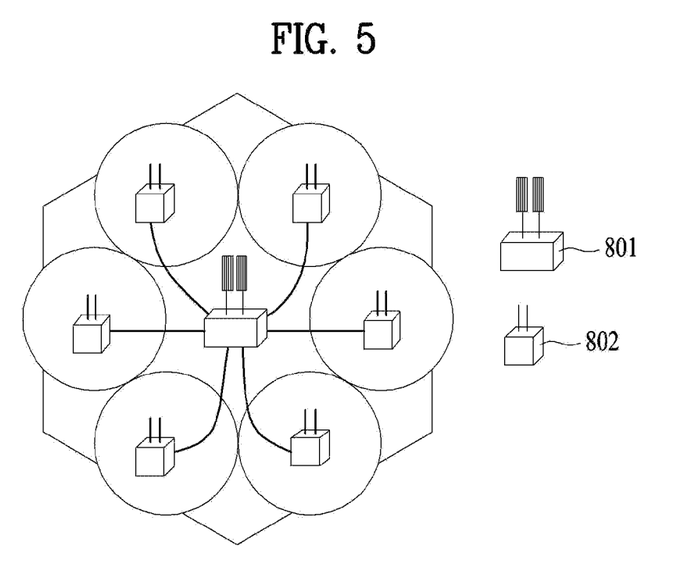
FIG. 5 is a diagram illustrating the configuration of a heterogeneous network to which a CoMP scheme is applicable.

FIG. 5 is a diagram illustrating the configuration of a heterogeneous network to which a CoMP scheme is applicable. In particular, FIG. 5 shows a network including a macro eNB 801 and radio remote heads (RRHs) 802 for transmitting and receiving a signal with a relatively low transmit power. A pico eNB or RRH located in a coverage of the macro eNB may be connected to the macro eNB via an optical cable, etc. In addition, the RRH may also be referred to as a micro eNB.

Referring to FIG. 5, since the transmission power of the micro eNB such as the RRH is relatively lower than that of the macro eNB, it can be seen that the coverage of each RRH is smaller than that of the macro eNB.

In such a CoMP scenario, as compared to a legacy system in which only a macro eNB is present, a coverage hole of a specific region may be covered through added RRHs or cooperative transmission may be performed using a plurality of transmission points (TPs) including an RRH and a macro eNB, thereby increasing overall system throughput.

Meanwhile, in FIG. 5, the RRHs may be classified into two types of RRHs: RRHs assigned cell IDs different from an ID of the macro eNB and regarded as small cells and RRHs with the same cell ID as the macro eNB.

In the case in which RRHs are assigned cell IDs different from the ID of the macro eNB, a UE recognizes the RRHs as independent cells. A UE located at the boundary of each cell receives severe interference from a neighboring cell. Various CoMP schemes have been proposed to reduce such interference and increase transmission rate.

Next, in the case in which RRHs are assigned the same cell ID as the ID of the macro eNB, as described above, the UE recognizes the RRHs and the macro eNB as one cell. The UE receives data from each RRH and the macro eNB. In case of a data channel, precoding used by each UE for data transmission is simultaneously applied to an RS so that each UE may estimate an actual channel thereof on which data is transmitted.

Hereinafter, UL transmit power control will be described.

In a wireless communication system, a UE periodically measures a received signal level and signal quality of a serving cell. Information about the measured signal level and/or signal quality is used for various purposes and, particularly, may be used when the UE determines power output for UL (hereinafter, referred to as UL transmit power).

Control of UL transmit power is a basic element of the wireless communication system. The purpose of controlling UL transmit power is to adjust the magnitude of a received signal in an eNB to an appropriate level. By keeping the magnitude of the received signal proper, unnecessary power consumption in a UE can be prevented and transmission efficiency can be improved through adaptive data transmission rate determination.

Generally, UL transmit power may be divided into two modes: open loop power control and closed loop power control. Open loop power control includes UL transmit power compensation through estimation of UL signal attenuation by measuring or estimating DL signal attenuation and includes UL transmit power determination considering the amount of radio resources allocated to the UE or the attributes of transmitted data. Closed loop power control includes UL transmit power adjustment using information included in a closed loop power control message received from the eNB.

$$P(i)=\min\{P_{MAX}, \alpha \times PL + A(i) + f(i)\}$$ [Equation 1]

Equation 1 represents a method for determining UL transmit power according to the UL power control mode. Here, P(i) denotes a UL transmit power of an i-th time point (i.e. a subframe index i), $P_{MAX}$ denotes a maximum transmit power of the UE, PL denotes a pathloss estimate of a DL signal, and α and A(i) are parameters given according to a higher-layer signal, attributes of transmitted data, the amount of allocated resources, etc., at an i-th time point. Such parameters are used for open loop power control.

In addition, f(i) is a power control value of a subframe index i, determined by information included in a closed loop power control message received from the eNB and corresponds to a parameter for closed loop power control.

The biggest aim of open loop power control is to adjust the magnitude of transmission signal at the UE, that is, UL transmit power, to an appropriate level, by factoring a DL signal attenuation level estimated or calculated under the assumption that a UL signal attenuation level is identical to the DL signal attenuation level. The proper magnitude of the transmission signal is determined by the parameter A(i). Closed loop power control corresponding to the parameter f(i) of Equation 1 aims at compensating for inconsistency between UL signal attenuation and DL signal attenuation and channel fading varying with a faster time scale than average signal attenuation.

That is, the open loop power control parameter is a parameter for controlling power in the manner of estimating DL signal attenuation from an eNB of a serving cell and compensating for the DL signal attenuation. For example, if DL signal attenuation becomes severe because a UE and an eNB to which the UE is connected become increasingly distant from one another, UL transmit power is controlled by further raising UL transmit power. The closed loop power control parameter is used to control UL transmit power such that the eNB directly transmits information (control signals) necessary for control of UL transmit power.

The present invention provides a power control method of an SRS in the case in which DL CoMP based on the SRS is performed. Especially, as the above-described heterogeneous network including a macrocell and a picocell, a situation in which a DL CoMP cell set is different from a UL CoMP cell set or a situation in which a CoMP signal is received on DL and a single-cell signal is transmitted on UL is described by way of example.

First, it is desirable to differently set the transmit power of the SRS depending upon whether the SRS is to be transmitted towards the macrocell or towards the picocell. That is, a parameter is adjusted through radio resource control (RRC) signaling such that the SRS is directed towards the macrocell at a specific period (e.g. specific subframes) and the SRS is directed towards the picocell at another period. This method may be regarded as a method for differently adjusting the parameter of the SRS, especially, the transmit power of the SRS, in linkage with a subframe index.

Alternatively, the same operation may be performed through an additional control signal rather than RRC signaling. In particular, for aperiodic SRS transmission of transmitting an SRS as a response to a triggering signal of the eNB, additional information is needed as to towards which cell a triggered SRS should be transmitted and as to with how much transmit power the SRS should be transmitted. To this end, a method for adding a bit field related to the above additional information to control information transmitted through an existing PDCCH, especially, control information including a bit field for triggering the SRS or for defining additional physical layer control information may be considered.

Meanwhile, the SRS may be transmitted together with or separately from a PUSCH with different transmit power. Especially, the case in which the parameter is configured such that the SRS and the PUSCH are directed towards the same cell does not cause a big problem because the transmit power of the PUSCH is not greatly different from that of the SRS. However, if the parameter is configured such that the SRS and the PUSCH are directed towards different cells, for example, if the SRS is directed towards the macrocell and the PUSCH is directed towards the picocell, there may be a big difference between the transmit power of the PUSCH and the transmit power of the SRS. Such a considerable power difference between symbols has a problem with a high probability of distorting signals of adjacent symbols due to excessive transition time of transmit power at the interior of the UE.

First Embodiment

1) First, such a problem may be solved by not using the prior symbol and/or next symbol of an SRS symbol. For example, when a normal CP is applied, since an SRS is located on the 14th symbol, a PUSCH signal mapped to the 13th symbol may be rate-matched or a PUSCH signal mapped to the first symbol of the next subframe may be rate-matched. Alternatively, a method in which a scheduler such as a serving cell does not schedule a subframe in which the SRS is transmitted and/or the next subframe for use of a PUSCH or a PUCCH may be considered during SRS transmission.

The above operation may be limited so as to be applied only to configuration of a specific SRS expressed as a subframe pattern or for the case in which the difference in transmit power between the SRS and another UL channel is a predetermined threshold value or more. An additional control signal for limitation of the above operation may be signaled to the UE through a higher layer signal such as an RRC signal.

If the UE is to transmit ACK/NACK, that is, a PUCCH, in a subframe in which an SRS is transmitted or in the next subframe, wherein the difference between the transmit power of the SRS and that of the PUCCH is a predetermined threshold value or more, the UE may not transmit the SRS or the UE may stop transmission of the PUCCH in the first slot of a subframe contiguous to the subframe in which the SRS is transmitted and instead amplify the transmit power of the PUCCH in the second slot of the contiguous subframe.

Particularly, if a TDD system is configured such that a DL subframe should always be located after a UL subframe in which the SRS is transmitted, since there is no UL transmission in the next subframe of the UL subframe in which the SRS is transmitted, the above-described problem does not occur. Similarly, if the SRS is transmitted in the first appearing UL subframe after a special subframe, the above-described problem may be mitigated.

2) If a system is limited to the TDD system, another method being considered to solve the above-described problem is to transmit the SRS directed towards other cells only in a special subframe. Notably, a legacy SRS is transmitted in a UpPTS and only the last one symbol is configured for the UpPTS for the SRS, whereas two symbols are preferably configured for the UpPTS, the first one of the two symbols being configured to transmit an SRS and the second one being configured not to transmit the SRS, thereby minimizing the influence of the SRS on contiguous symbols. In this case, the second symbol is preferably used as transition time of transmit power.

To this end, a network may additionally inform some UEs of such a configuration of the special subframe through specific RRC signaling and, for the other UEs (especially, legacy UEs that do not understand new signaling), the network may configure the corresponding symbols of the special subframe as a guard period or as a two-symbol UpPTS used for an RACH.

As described previously, the proposed method may be pre-configured to be applied only when the difference in transmit power on contiguous symbols exceeds the threshold value.

Second Embodiment

Meanwhile, in the case in which a PUCCH including ACK/NACK is transmitted towards a specific cell in a subframe and an SRS is transmitted towards another cell in the same subframe, if the PUCCH including ACK/NACK is dropped, DL throughout may be reduced. Similarly, during application of a CoMP scheme, CSI needs to be immediately or dynamically ensured and thus, if the SRS is inevitably dropped in a specific situation, accurate channel state measurement may be impossible and gain of the DL CoMP scheme may be significantly reduced. Therefore, the SRS cannot always be dropped.

Consequently, it is desirable to determine whether to drop the PUCCH including ACK/NACK or the SRS according to the condition mentioned in the first embodiment, for example, the condition that the difference in transmit power between the SRS and the PUCCH is above a predetermined threshold value.

As an explicit implementation method in terms of an eNB, an aperiodic SRS may be configured to be transmitted in a specific subframe so that the PUCCH is not transmitted in the specific subframe. To this end, specific DL control information (this is defined as a DCI format transmitted through a PDCCH in an LTE system) is used to configure only the aperiodic SRS and is not used for DL scheduling information.

For example, instead of informing the UE that the specific DCI format is not for DL scheduling information by setting a resource allocation bit of a specific DCI format to a preset value, new DCI content, that is, a dummy grant, is configured to use only a field related to SRS configuration as valid information. Although the specific DCI format is the same as a legacy DCI format, the content configuration and usage therebetween are different. In the above operation, the DCI format includes even a DCI format including a UL grant as well as a DCI format including a DL grant.

Third Embodiment

Meanwhile, the afore-mentioned problem may be solved by allocating a plurality of transmission power control (TPC) indexes to one UE while an aperiodic SRS configuration and an SRS subframe related configuration, defined in a legacy LTE system, are maintained. In the LTE system, TPC is defined in DCI format 3/3A transmitted through a PDCCH. According to the third embodiment, a legacy DCI format structure is maintained but much information is obtained from a plurality of TPC indexes, thereby extending the range of adjustment of transmit power.

More specifically, if each TPC index is expressed as two bits and three indexes are allocated, information of a total of 6 bits is transmitted to a specific UE so that transmit power setting values of a wider range may be transmitted. As a detailed example, assuming that one TPC index expresses one value of [−1, 0, 1, 2], if three TPC indexes are given, +6 dB may be expressed through (+2, +2, +2) or −3 dB may be expressed through (−1, −1, −1). As a result, a range capable of expressing transmit power increases as compared with a conventional range from −1 dB to 2 dB. N TPC indexes may be allocated to a specific UE through pre-designated higher layer signaling.

Although a TPC field included in the DCI format may be extended to 6 bits in order to achieve the same object, in this case, a new DCI format is needed. In addition, since TPC has an effect on all UL channels, an additional configuration may be needed so that such an operation affects only an SRS.

The UE may be implemented such that the third embodiment of the present invention is applied by a specific threshold value. For example, if the difference in transmit power between an SRS and a UL channel is K dB or more, an existing TPC value of 1 dB may be interpreted as a value of 5 dB.

Fourth Embodiment

As a still considered method, transmission of a PUSCH and an SRS may be configured to suit a picocell first and the transmit power of the SRS directed towards a macrocell may be adjusted using an offset value. The offset value or candidates of the offset value, for the SRS directed towards the macrocell, may be set through a higher layer signal or a physical layer signal.

For example, the transmit power of the SRS directed towards the picocell may be changed every subframe by TPC transmitted through a PDCCH. In this case, since the transmit power of the SRS directed towards the macrocell is configured by adding the offset to the transmit power of the SRS directed towards the picocell, the transmit power of the SRS directed towards the macrocell may be changed every subframe. The offset value may be semi-statically determined based on candidates of an offset value set using a higher layer signal.

If a UE transmits two different SRSs directed towards the picocell and the macrocell, an offset value suitable for each SRS may be pre-signaled using an RRC signal and the offset value may be selected dynamically, that is, in the unit of subframes. The dynamic change of the transmit power offset value of the SRS is preferably performed using the PDCCH. In particular, the offset value may be indicated using a grant for triggering an aperiodic SRS. For example, if a TPC value of (12, 10, 8, 1) is signaled through an RRC signal, an offset value for the SRS directed towards the macrocell may be selected as the grant for triggering the aperiodic SRS.

Conceptually, it is obvious that the transmit power offset for a PUSCH directed towards the picocell may be configured to determine the transmit power of the SRS directed towards the picocell based on the RRC signal, and an additionally signaled transmit power offset may be configured to be used for the SRS directed towards the macrocell. In this case, an indication as to whether to use the additionally signaled transmit power offset may be regarded as being achieved by a PDCCH, more specifically, by the grant for triggering the aperiodic SRS transmitted through the PDCCH. Especially, a TPC field included in the grant for triggering the aperiodic SRS may be used for the indication of the offset value.

That is, the existing TPC field of the grant for triggering the aperiodic SRS may be used to select one of a plurality of transmit power offset values unlike an original purpose. A 1-bit TPC field may be used to indicate one of two transmit power offsets. Likewise, a 2-bit TPC field may be used to indicate one of more transmit power offsets.

Meanwhile, if only two types of SRSs are present and a 2-bit TPC field is used, more transmit power offsets may be allocated to the SRSs. For example, after three transmit power offsets are signaled to an SRS directed towards a macrocell and one transmit power offset is signaled to an SRS directed towards a picocell, one transmit power offset (i.e. one of the three allocated transmit power offsets) to be used by the SRS directed towards the macrocell may be signaled using the TPC field of the grant for triggering the aperiodic SRS.

In addition, if the 2-bit TPC field is used, one bit may be used for existing TPC and only the other one bit may be used to select the transmit power offset. That is, some bits may be used to maintain an existing usage and the other bits may be used to select the transmit power offset.

This is one example and a method for configuring various combinations of transmit power offsets and indicating one of the combinations of transmit power offsets may be used.

Fifth Embodiment

As described above, a location at which a PUSCH/PUCCH is received may not be the same as a location at which an SRS is received. As a result, there is a high probability that two types of channels are under different communication environments (e.g. different pathloss or different interference levels). This can be directly solved by applying separate power control values to the two types of channels as opposed to the above-described embodiments.

For example, a UE may use a result measured based on a location at which a corresponding channel is received as pathloss, which is a criterion for performing open loop power control. That is, since a PUSCH is to be received by a neighbor picocell, power control of the PUSCH is performed based on pathloss from the picocell. On the other hand, since an SRS is to be received by a distant macrocell, power control of the SRS may be performed based on pathloss from the macrocell. Additionally, the UE may receive TPC commands corresponding to the PUSCH and the SRS and perform independent power control to raise or lower the transmit powers of the PUSCH and the SRS.

In this way, if the transmit powers of the two UL channels are separately controlled, the difference between the transmit powers of the two channels may significantly increase and, thus, two output power levels cannot be stably maintained while the UE uses successive symbols. Further, since an accumulation value of the TPC commands or a pathloss estimate from each reception point are parameters known only to the UE, an eNB is unable to know the magnitude of the difference between the transmit powers of the two channels. Hence, the transmit powers of the two channels may exceed levels capable of maintaining a stable operation as the result of controlling the transmit powers of the two channels by the eNB.

The present invention additionally proposes a series of schemes capable of avoiding such a situation while minimizing a negative effect on UL transmission of the UE.

First, in the case in which an SRS is scheduled to be transmitted at a specific time point, if a PUSCH/PUCCH is not scheduled to be transmitted on a neighbor symbol of the specific time point, the UE performed transmit power control of the SRS according to a TPC command. However, if the PUSCH/PUCCH is scheduled to be transmitted on the neighbor symbol (i.e. in a subframe in which the SRS is transmitted or the next symbol) and the difference in transmit power between the SRS and the PUSCH/PUCCH exceeds an operating range of the UE, the UE transmits the PUSCH/PUCCH first according to the TPC command and transmits the SRS next with a readjusted transmit power of an operable level.

Meanwhile, the UE may inform the eNB of information about the transmit power of the SRS, which can be a maximum transmit power while maintaining the transmit power of the PUCCH/PUSCH of a current level, in order to aid in proper TPC of the eNB. In other words, the UE may report as to how much transmit power can be increased from the transmit power of the SRS of a current level (or from the latest transmitted power of the SRS) while transmitting the PUCCH/PUSCH at a current level.

Such information may be an average value of transmit powers for operations which are generated/has been generated over a plurality of time/frequency regions or may be a value for an instantaneous operation generated in a specific time/frequency region. In this case, since the transmit power of the PUCCH/PUSCH is affected by the size of transmission bits or the number of allocated RBs as well as by a TPC command or pathloss, the UE may determine the transmit power of the PUCCH/PUSCH of a current level under the assumption of the size of bits and/or the number of RBs which are referred to upon performing such reporting.

The size of bits and the number of RBs may be a predetermined value or a value transmitted by the eNB through a higher layer signal. Upon receiving such information, the eNB may use the information to discern the difference in transmit power between the PUCCH/PUSCH and the SRS and determine as to how much the UE can raise the transmit power of the SRS. Then, the eNB may perform a proper operation according to the information.

For example, if the UE reports that there is a big difference between the transmit powers of the SRS and the PUCCH/PUSCH to the eNB, the eNB may perform an operation of reducing the difference in transmit power between the two signals by allocating more RBs to the PUSCH at a time point near SRS transmission or perform an operation of not scheduling the PUCCH/PUSCH at a time point near SRS transmission.

Sixth Embodiment

Meanwhile, if an SRS directed towards a macrocell is transmitted with a high power, an SRS directed towards a picocell transmitted with a relatively low power is significantly affected by the SRS directed towards the macrocell.

Therefore, the simplest solution of the above problem is that the SRS directed towards the macrocell (or an SRS having a very big difference in transmit power with an already transmitted SRS so as not to be controlled by a conventional transmit power control scheme) and the SRS directed towards the picocell (or an SRS having a transmit power difference with the already transmitted SRS so as to be controlled by the conventional transmit power control scheme) are not simultaneously transmitted in the same subframe.

However, since this method may be restricted to SRS transmission, the sixth embodiment of the present invention proposes a method for controlling the transmit power of the SRS based on interference over thermal noise (IoT) at a receiving device. That is, if interference exceeding an IoT threshold value, incapable of being endured by the picocell, is sensed, the picocell may request that the macro cell perform power control for the SRS directed towards the macrocell by transmitting related information to the macrocell (X2 signaling). It is desirable that the microcell transmit a response as to whether the microcell can perform power control or information related to the response to the picocell. In this way, an operation for adjusting an IoT level by exchanging information between the macrocell and the picocell in a DL CoMP scheme or similar situation.

As an example of a means for triggering the proposed embodiments, a method for signaling a UE-specific threshold value associated with a power difference may be considered. Obviously, the same threshold value may be configured for all UEs. Then, if the difference in transmit power between a PUSCH and an SRS, transmitted by the UE, is above a pre-designated value, the above proposed method is performed. Here, as the threshold value associated with the power difference, a different threshold value per channel may be configured such as a threshold value for the ratio of the transmit power of the PUSCH to the transmit power of the SRS or a threshold value for the ratio of the transmit power of the PUCCH to the transmit power of the PUSCH.

For example, when a maximum difference value between the transmit power of the PUSCH and the transmit power of the SRS is set to 10 dB, in the case in which the UE should transmit the SRS directed towards the macrocell of 20 dB in a subframe in which a PUSCH directed towards the picocell is transmitted at the transmit power of 5 dB, the UE may transmit the SRS by applying the embodiments of the present invention because the transmit power difference exceeds 10 dB.

The proposed embodiments may be applied independently or in a combined form. For example, the transmit power of the SRS may be controlled by transmitting newly defined DL control information while transmitting the SRS using a special subframe and this operation may be triggered based on the above-described threshold value.

Figure 6:
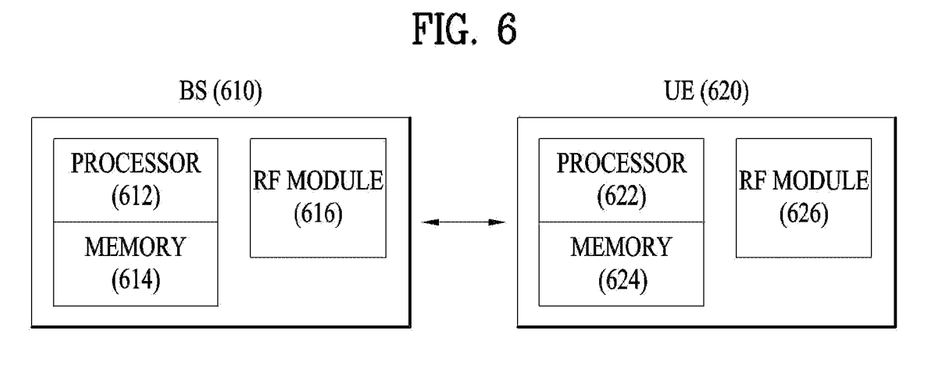
FIG. 6 illustrates a base station (BS) and a user equipment (UE) that are applicable to embodiments of the present invention.

FIG. 6 illustrates a BS and a UE that are applicable to embodiments of the present invention.

Referring to FIG. 6, a wireless communication system includes a BS 610 and a UE 620. The BS 610 includes a processor 612, a memory 614, and a Radio Frequency (RF) unit 616. The processor 612 may be configured to perform the proposed procedures and/or methods according to the present invention. The memory 614 is connected to the processor 612 and stores various types of information related to operations of the processor 612. The RF unit 616 is connected to the processor 612 and transmits and/or receives radio signals. The UE 620 includes a processor 622, a memory 624, and an RF unit 626. The processor 622 may be configured to perform the proposed procedures and/or methods according to the present invention. The memory 624 is connected to the processor 622 and stores various information related to operations of the processor 622. The RF unit 626 is connected to the processor 622 and transmits and/or receives radio signals. The BS 610 and/or the UE 620 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described sounding signal transmission and apparatus in an eNB cooperative wireless communication system have been described centering on an example applied to a 3GPP LTE system, the present invention is applicable to a variety of wireless communication systems in addition to 3GPP LTE.

The invention claimed is:
1. A method for transmitting a sounding reference signal by a user equipment in a wireless communication system, the method comprising:
   receiving a first transmit power offset value of a sounding reference signal for a first cell from a network;

receiving a second transmit power offset value of a sounding reference signal for a second cell from the network;

determining a transmit power of the sounding reference signal for the first cell based on a transmit power of an uplink data channel for a second cell and on the first transmit power offset value;

determining a transmit power of the sounding reference signal for the second cell based on a transmit power of the uplink data channel for the second cell and on the second transmit power offset value; and transmitting the sounding reference signal for the first cell to the first cell, wherein the first transmit power offset value is received via a transmission power command field and the second transmit power offset value is received via higher layer signaling.

2. The method according to claim 1, further comprising:
transmitting the sounding reference signal for the second cell to the second cell.

3. The method according to claim 2, wherein the sounding reference signal for the first cell is an aperiodic sounding reference signal and the sounding reference signal for the second cell is a periodic sounding reference signal.

4. The method according to claim 1, further comprising
receiving an aperiodic sounding reference signal triggering message from the second cell,
wherein the aperiodic sounding reference signal triggering message includes an indicator of an offset value to be applied to the transmit power of the sounding reference signal for the first cell among the at least one first transmit power offset value.

5. A user equipment in a wireless communication system, comprising:
a receiver;
a transmitter; and
a processor operatively connected to the receiver and the transmitter, the processor configured to:

receive a first transmit power offset value of a sounding reference signal for a first cell from a network;

receive a second transmit power offset value of a sounding reference signal for a second cell from the network;

determine a transmit power of the sounding reference signal for the first cell based on a transmit power of an uplink data channel for a second cell and on the first transmit power offset value;

determine a transmit power of the sounding reference signal for the second cell based on a transmit power of the uplink data channel for the second cell and on the second transmit power offset value; and transmit the sounding reference signal for the first cell to the first cell, wherein the first transmit power offset value is received via a transmission power command field and the second transmit power offset value is received via higher layer signaling.

6. The user equipment according to claim 5,
wherein the transmitter transmits the sounding reference signal for the second cell to the second cell.

7. The user equipment according to claim 6, wherein the sounding reference signal for the first cell is an aperiodic sounding reference signal and the sounding reference signal for the second cell is a periodic sounding reference signal.

8. The user equipment according to claim 5,
wherein the receiver receives an aperiodic sounding reference signal triggering message from the second cell, and
the aperiodic sounding reference signal triggering message includes an indicator of an offset value to be applied to the transmit power of the sounding reference signal for the first cell among the at least one first transmit power offset value.

* * * * *